United States Patent [19]

Horinishi et al.

[11] Patent Number: 5,734,934

[45] Date of Patent: Mar. 31, 1998

[54] EMISSION ANGLE VARIABLE FLASH APPARATUS

[75] Inventors: Katsumi Horinishi, Hashimoto; Akira Iwamoto, Kadoma; Mitsuo Fuke, Nara; Katsunori Kawabata; Shinji Ando, both of Osaka, all of Japan

[73] Assignee: West Electric Co., Ltd., Japan

[21] Appl. No.: 714,418

[22] Filed: Sep. 16, 1996

[30] Foreign Application Priority Data

Sep. 18, 1995 [JP] Japan .................................. 7-237957

[51] Int. Cl.⁶ .......................... G03B 15/02; G03B 15/06
[52] U.S. Cl. .................... 396/62; 396/175; 396/200; 362/18
[58] Field of Search ..................... 396/62, 175, 200, 396/795; 362/18, 17, 16

[56] References Cited

FOREIGN PATENT DOCUMENTS

| 2740558 | 3/1979 | Germany | 396/795 |
|---|---|---|---|
| 3-188431 A | 8/1991 | Japan | 396/795 |

OTHER PUBLICATIONS

Patent Abstracts of Japan, Publ. No. 55129326, dated Oct. 10, 1980.

Patent Abstracts of Japan, Publ. No. 02291538, dated Dec. 3, 1990.

*Primary Examiner*—David M. Gray
*Assistant Examiner*—Eric Nelson
*Attorney, Agent, or Firm*—Parkhurst & Wendel

[57] ABSTRACT

An emission angle variable flash apparatus of the invention alters an angular aperture to be formed by side reflection plates disposed oppositely to both side surfaces of a reflector in linkage with a change of a distance between a Xe tube and a reflector on their optical axis, thereby enhancing the efficiency of utilization of flash from a light source and expanding a variable range of an emission angle in the horizontal direction. As a result, the emission angle variable flash apparatus of the invention is made smaller in size than in the prior art.

4 Claims, 6 Drawing Sheets

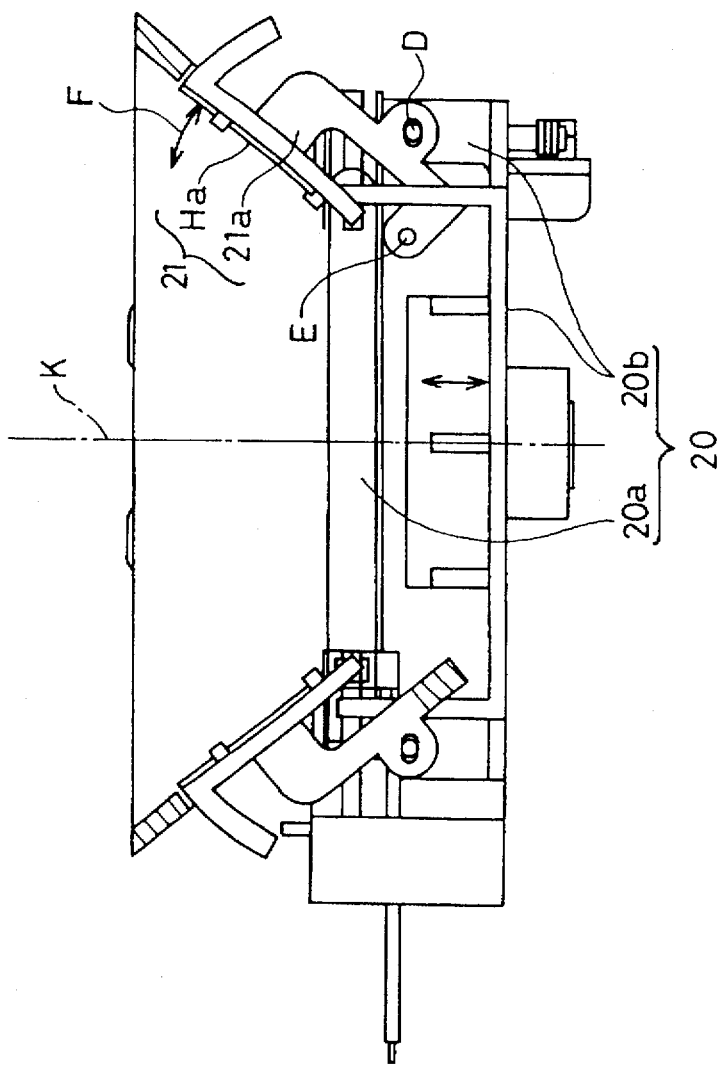

EMISSION ANGLE VARIABLE FLASH APPARATUS

FIELD OF THE INVENTION

The present invention relates to an emission angle variable flash apparatus capable of varying an emission angle from a light source to a subject of emission.

BACKGROUND OF THE INVENTION

Hitherto, to take a subject by photographic means such as camera, an emission angle variable flash apparatus, such as emission angle variable strobe capable of varying the emission angle depending on the photographic angle of view of the camera lens has been often used for illuminating the subject.

An example of conventional emission angle variable flash apparatus is disclosed in Japanese Laid-open Patent 55-129326, in which the emission angle to the subject is varied by changing the configuration of a flash tube S and a reflector 3, by moving the flash tube S as a light source positioned at a distance La from the reflector 3 on an optical axis K, as shown in FIG. 5 (a), to a position at distance Lb from the reflector 3 on the optical axis K, as shown in FIG. 5 (b), depending on the photographic angle of view of a camera lens to be used.

Another example is disclosed in Japanese Laid-open Patent 2-291538, in which, as shown in FIG. 6, the emission angle in the horizontal direction to the subject is varied by changing the configuration of a light source P, a reflector 13, and a Fresnel lens F, by moving the light source P positioned at a distance Ls from the reflector 13 on the optical axis K, and the Fresnel lens F positioned on the angular aperture surface of the reflector 13, in a wide angle mode for wide angle photography, and the light source P to a position at a distance Ld from the reflector 13 on the optical axis K, and the Fresnel lens F to a position at a distance Lf from the angular aperture surface of the reflector 13, in a telephoto mode for telephotography.

The known emission angle variable flash apparatus of this type involved the following defects.

In the prior art shown in FIG. 5, since the configuration of the flash tube S and the reflector 3 on the optical axis is varied from the distance La to the distance Lb, the change of the emission angle in the horizontal direction due to the change of the reflection condition was small, and hence the efficiency of utilization of flash from the flash tube S was not excellent.

That is, as shown in FIG. 5 (c), when a straight tube type such as a xenon tube 52 is used as the flash tube shown in FIG. 5 (a) and FIG. 5 (b), generally, the relation is as follows: q1'>q1, q2'>q2, , q3'>q3 (where q1, q2, q3 are respectively ranges of light reflected by the right side reflection plate 3a of the reflector 3, of the light emitted from the left, middle, and right end of the xenon lamp 52, and q1', q2', q3' are ranges of light emitted directly from each opening), and therefore the light reflected by the right and left side reflection plates 3a is considerably smaller than the light directly emitted from the opening of the reflector 3, and if the condition of reflection is changed by the moving amount of the xenon lamp 52, the change of the emission angle in the longitudinal direction of the xenon tube 52 is small. Small change of the emission angle in the longitudinal direction of the xenon tube 52 means nothing but insufficient control of emission light from the xenon lamp 52 in this direction, and, in other words, it means a defect that the flash from the xenon tube 52 cannot be utilized efficiently in this direction.

Or, in the prior art in FIG. 6, either one of the light source P and the reflector 13 is moved in the direction of shortening the distance between the light source P and the reflector 13 on the optical axis K, and the Fresnel lens F is moved forward and the emission angle is varied, and therefore at least a volume portion due to the moving distance Lf of the Fresnel lens F is increased, and the entire apparatus becomes larger than the case of the prior art shown in FIG. 5.

DISCLOSURE OF THE INVENTION

The invention is devised in view of the above problems, and it is hence a primary object thereof to present an emission angle variable flash apparatus reduced in size as compared with the prior art by expanding the variable range of the emission angle in the horizontal direction, and enhanced in the efficiency of utilization of flash light from a flash tube as the light source.

To achieve the object, the emission angle variable flash apparatus of the invention comprises a light source for emitting flash and a reflector for reflecting the flash from the light source to an emission subject, said apparatus being capable of varying emission angles of a direct light from the light source and a reflected light from the reflector to the emission subject: wherein side reflection means are disposed oppositely to both side surfaces of the reflector so as to reflect the flash from the light source in the horizontal direction; the light source and the reflector are so composed that a distance therebetween on their common optical axis may be variable; the side reflection means are so composed that an angular aperture to be formed thereby may be variable; and an emission angle control means is provided to control the changes of the distance between the light source and the reflector and the angular aperture to be formed by the side reflection means.

According to such apparatus, shortage of the variable range of the emission angle in the horizontal direction occurring due to alteration of the emission angle only by the change of the distance between the light source and the reflector on the optical axis can be compensated by changing the angular aperture to be formed by the side reflection means disposed oppositely to both side surfaces of the reflector.

In a preferred embodiment of the invention, the distance between the light source and the reflector on the optical axis is changed without moving the Fresnel lens, and the angular aperture to be formed by the side reflection means disposed oppositely to both side surfaces of the reflector are varied in linkage with such change, and therefore the shortage of variable range of the emission angle in the horizontal direction occurring due to alteration of the emission angle only by the change of the distance between the light source and reflector on the optical axis can be compensated by the change of the angular aperture to be formed by the side reflection means.

Hence, without increasing the size of the apparatus, the variable range of the emission angle in the horizontal direction can be expanded, and the size is made smaller than in the prior art, and moreover the efficiency of utilization of flash from the light source can be enhanced.

BRIEF DESCRIPTION OF THE DRAWINGS

FIG. 4 is a sectional view showing a specific constitution of a reflector portion of the emission angle variable flash apparatus shown in FIG. 2;

DESCRIPTION OF THE PREFERRED EMBODIMENTS

Preferred embodiments of the invention are illustrated in FIG. 1 through FIG. 4.

Figure 1A:
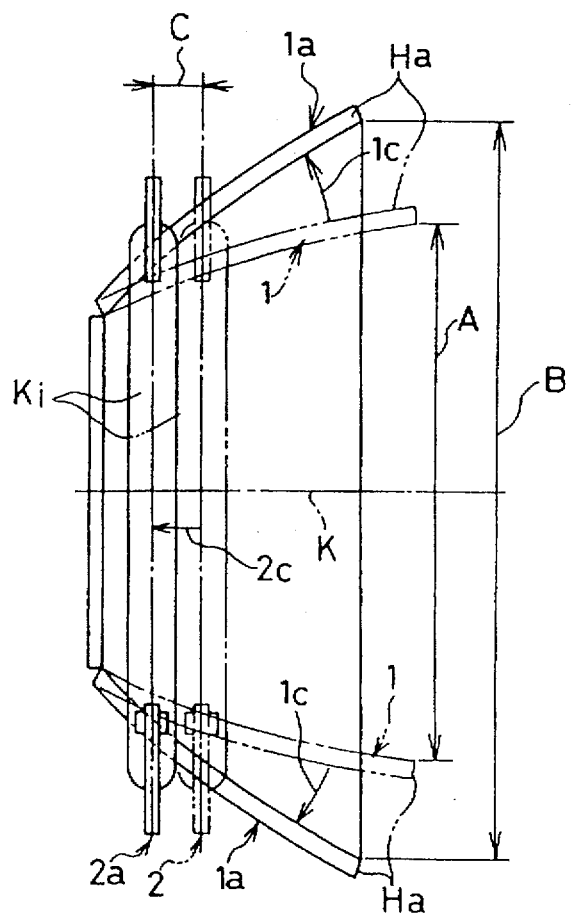
FIGS. 1(a) and 1(b) are essential structural diagrams of an emission angle variable flash apparatus in an embodiment of the invention.
Figure 1B:
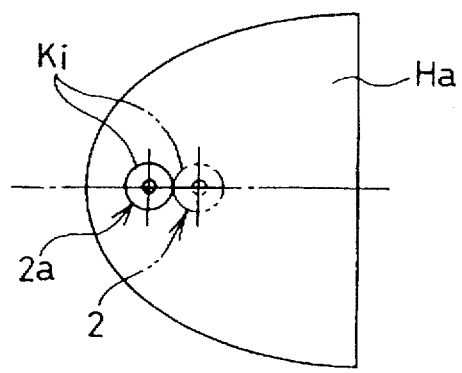

FIG. 1 is a structural diagram of a reflector portion which is an essential part of the emission angle variable flash apparatus showing an embodiment, and its sectional view in the horizontal direction is shown in FIG. 1 (a) as a plan view, and a sectional view in the vertical position in FIG. 1 (b) as a lateral view. In FIG. 1, reference numeral 1 shows the configuration of side reflection plates Ha as side reflection means in a wide angle mode for wide angle photography, and 1a denotes the configuration of the side reflection plates Ha in a telephoto mode for telephotography. Reference numeral 2 indicates the configuration of xenon tubes (Xe tubes) Ki which are one of flash discharge tubes as light source in the wide angle mode, and 2a shows the configuration of the Xe tube Ki in the telephoto mode.

First, in the wide angle mode for wide angle photography, the side reflection plates Ha are positioned in the configuration 1, and the Xe tubes Ki are positioned in the configuration 2. Herein, when the photographic mode is changed to the telephoto mode for telephotography, that is, in the telephoto mode, to focus the emission angle in the horizontal and vertical directions, the Xe tubes Ki are moved from the position of the configuration 2 to the direction (arrow 2c) of the configuration 2a, and at the same time the side reflection plates Ha are also moved from the position of the configuration 1 to the direction (arrow 1c) of the configuration 1a. Finally, in the telephoto mode, as shown by solid line, the Xe tubes Ki reach the position of the configuration 2a, and the side reflection plates Ha to the position of the configuration 1a.

In this way, as described in the prior art, with the move of the Xe tubes Ki alone, light distribution by alteration of the emission angle in the up-and-down or vertical direction changes appropriately, but the change of light distribution by alteration of the emission angle in the lateral or horizontal direction is small, and the flash from the Xe tubes Ki cannot be utilized effectively. This defect is solved by moving the side reflection plates Ha mounted on the side surfaces of the reflector and altering the angular aperture to be formed by the side reflection plates Ha.

As an actual example of this embodiment, supposing aperture width in the horizontal direction corresponding to the angular aperture to be formed by the side reflection plates Ha in the wide angle mode to be A=35 mm, the aperture width in the horizontal direction corresponding to the angular aperture to be formed by the side reflection plates Ha in the telephoto mode to be B=50 mm, and the moving distance in the optical axis K direction of the Xe tubes Ki to be C=3.75 mm, the light distribution angles in the vertical and horizontal directions are changed as follows.

Up-and-down (vertical) direction:

24.5° (telephoto mode) →61° (wide angle mode)

Right-and-left (horizontal) direction:

50° (telephoto mode) →83° (wide angle mode)

This change corresponds to the angle or view of a zoom lens of 24 mm to 80 mm. Moreover, this value of 50° in the horizontal direction in the telephoto mode means that the light can be focused sufficiently in the horizontal direction as well, and the flash from the Xe tubes Ki is utilized effectively.

Figure 2:
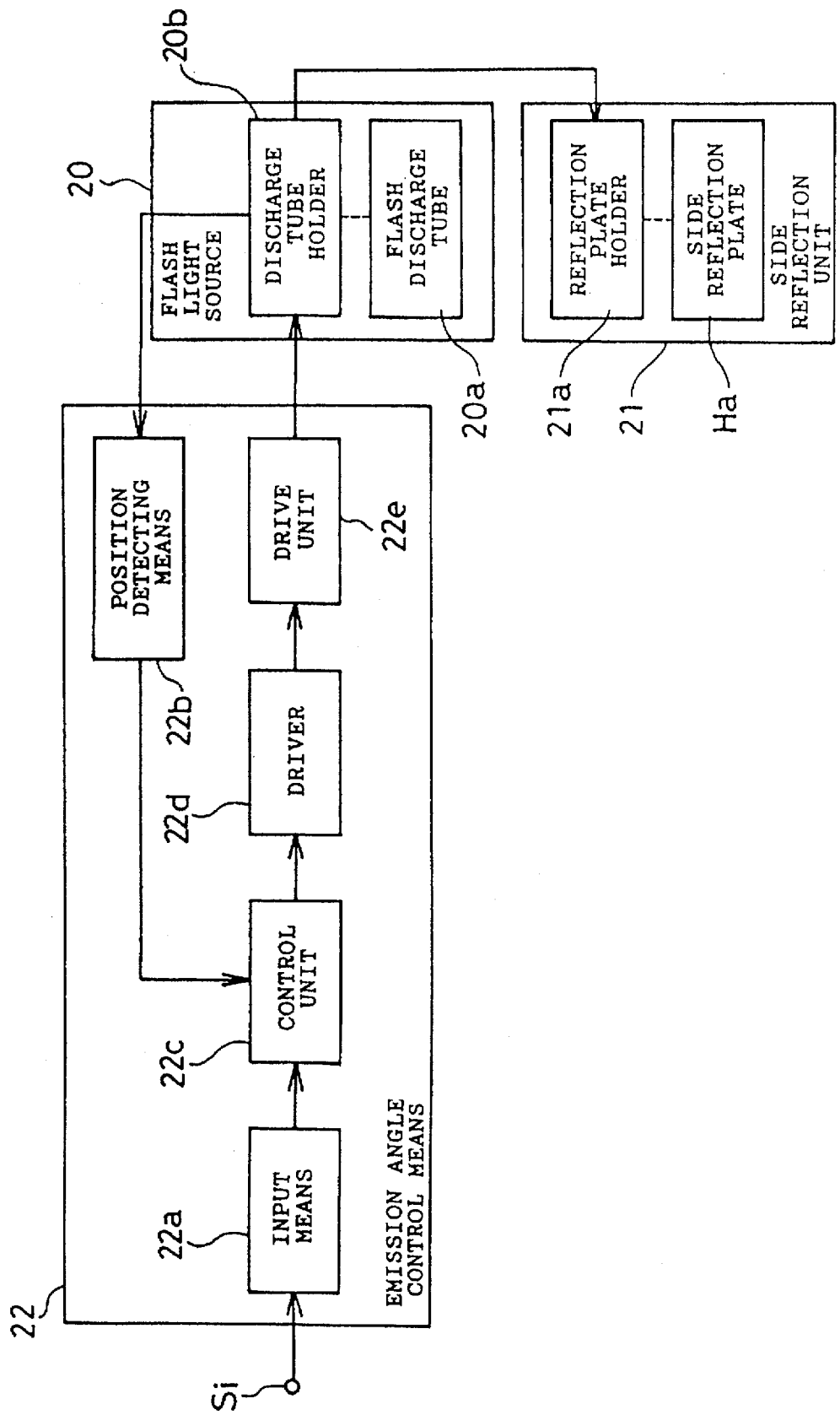
FIG. 2 is a general structural diagram of the emission angle variable flash apparatus having essential parts shown in FIG. 1.

In this embodiment, movement of the side reflection plates Ha and the Xe tubes Ki is controlled by an emission angle control means 22 shown in FIG. 2.

The emission angle control means 22 in the embodiment is described below while referring to the drawing.

FIG. 2 is a block diagram showing an entire constitution of the emission angle variable flash apparatus of the embodiment. In FIG. 2, reference numeral 20 is a flash light source, which is composed of a flash discharge tube 20a such as Xe tubes Ki shown in FIG. 1 and discharge tube holder 20b for holding the tube 20a. Reference numeral 21 is a side reflection unit, which is composed of side reflection plates Ha shown in FIG. 1 and reflection plate holders 21a for holding them.

In the flash light source 20, as the discharge tube holder 20b moves in the direction of optical axis K, the flash discharge tube 20a held by the discharge tube holder 20b is adapted to move in the direction of the optical axis K within the reflector. In the side reflection unit 21, as the reflection plate holders 21a move in the horizontal direction, the side reflection plates Ha held by the reflection plate holders 21a are adapted to oscillate in the horizontal direction in both side surfaces of the reflector.

Figure 3:
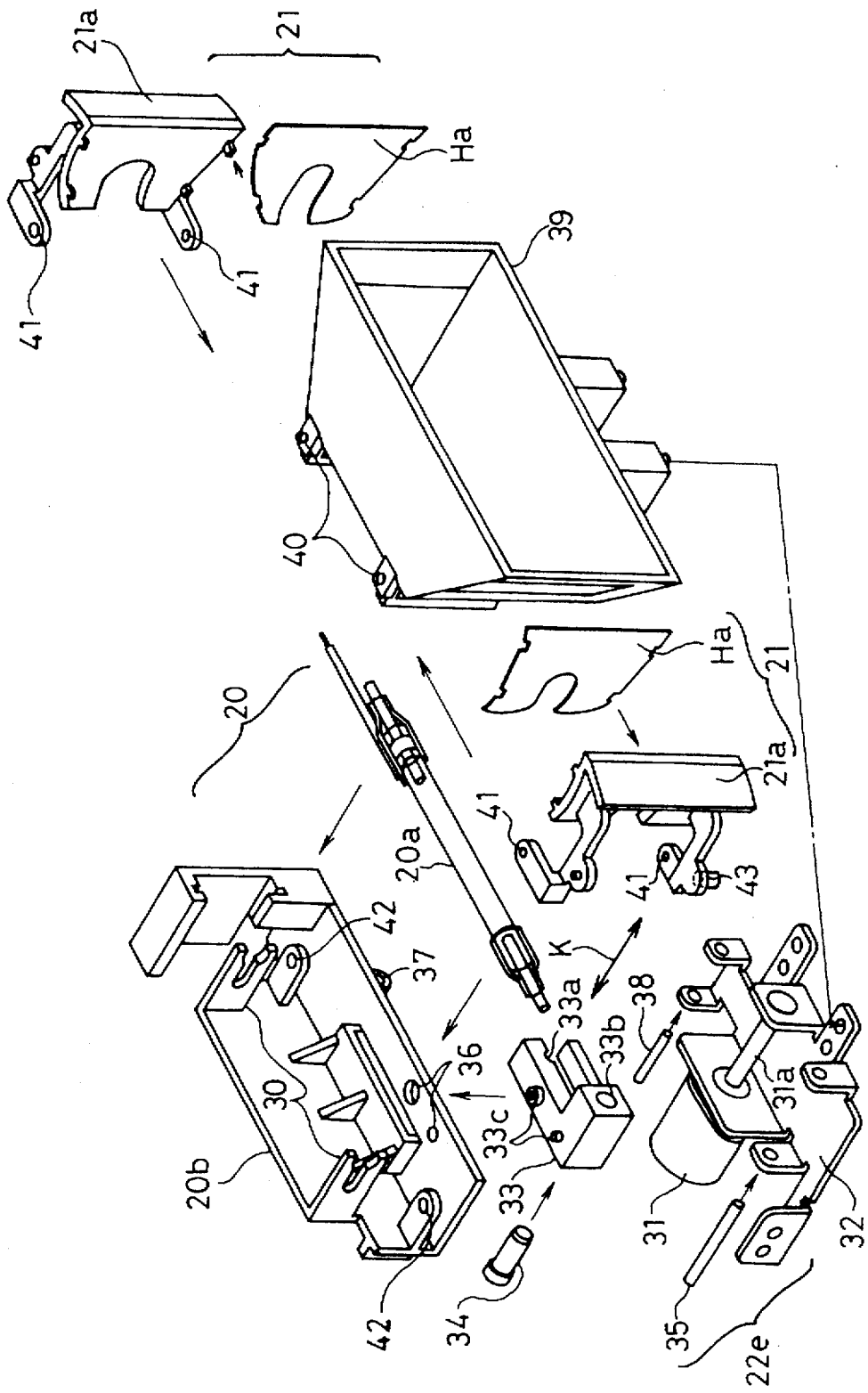
FIG. 3 is a perspective exploded view showing a specific structure of the emission angle variable flash apparatus shown in FIG. 2.
Figure 5A:
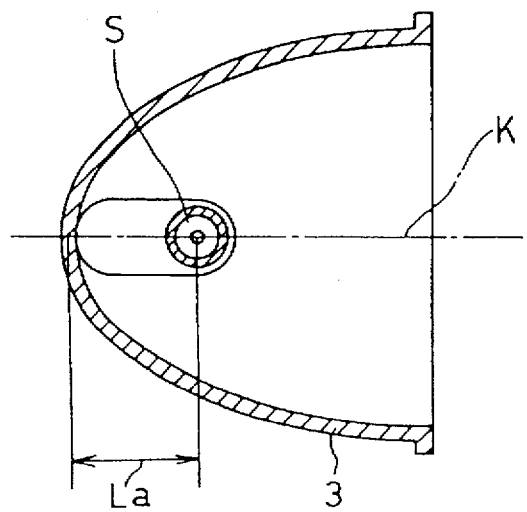
FIGS. 5(a) to 5(c) are essential structural diagrams of a conventional emission angle variable flash apparatus.
Figure 5B:
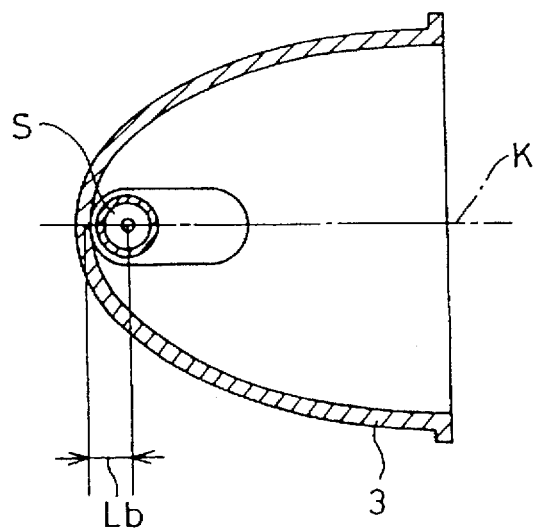
Figure 5C:
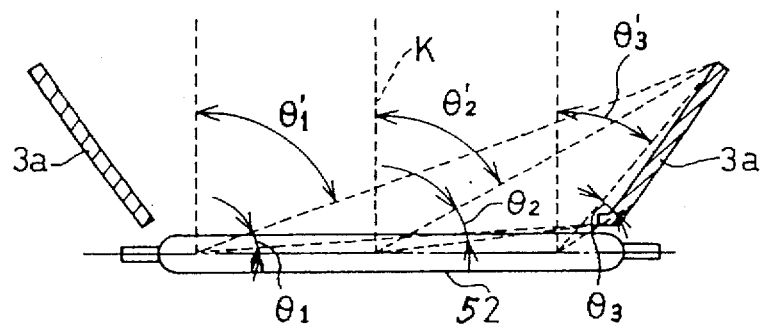
Figure 6:
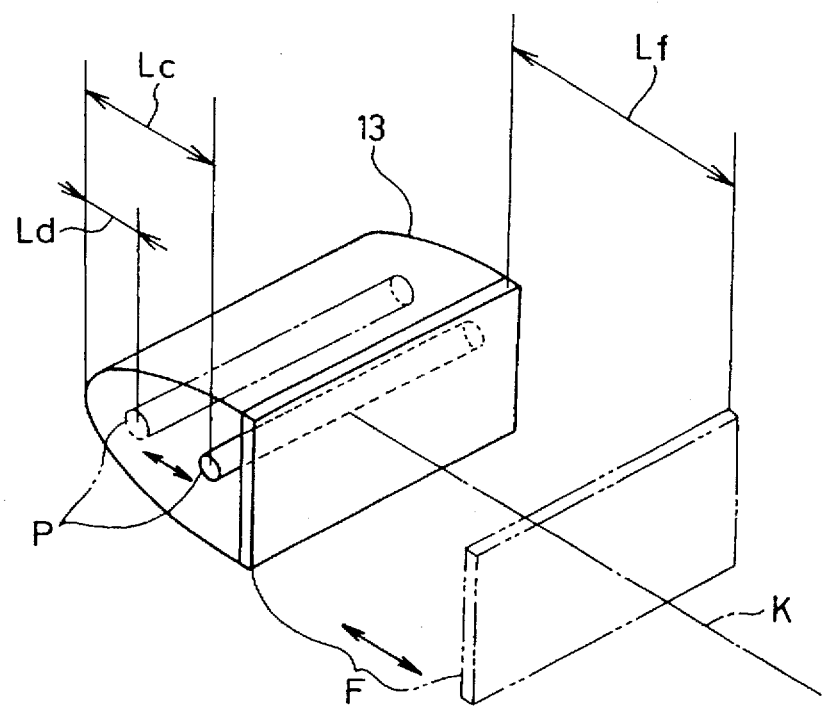
FIG. 6 is an essential structural diagram of an emission angle variable flash apparatus in other prior art.

Specific structures of thus constituted flash light source 20, the side reflection unit 21, and a drive unit 22e to be described later are shown in FIG. 3 and FIG. 4.

FIG. 3 is a schematic perspective exploded view of the flash light source 20 and others, and the flash light source 20 is composed of the flash discharge tube 20a and the discharge tube holder 20b for holding the flash discharge tube 20a by compressing the tube 20a with a pair of pinching parts 30.

The drive unit 22e comprises a drive source 31 mounted on a platform 32, such as a known stepping motor or a direct-current motor, and a sliding member 33 having an engaging portion 33a to be elastically engaged with a screw threaded portion formed on an output shaft 31a of the drive source 31. The sliding member 33 has a hole 33b in which, for example, an iron pipe 34 is inserted to prevent loosening, and is mounted on the platform 32 by inserting a sliding shaft 35 into the iron pipe 34 in order that rotary drive force of the drive source 31 is converted into a linear motion to move back and forth in the same direction as the optical axis K.

The discharge tube holder 20b is coupled with the sliding member 33 by fitting protrusions 33c of the sliding member 33 into holes 36, and is moved in the direction of the optical axis K in linkage with the movement of the sliding member 33, as a guide rod 38 provided in the platform 32 is inserted into a guide hole 37.

The reflection plate holder 21a is coupled with a reflection base 39 through holes 41 fitted rotatably with protrusions 40 of the reflection base 39 having a reflection surface formed on its inner surface by aluminum evaporation or the like, and are also coupled with the discharge tube holder 20b through protrusions 43 inserted into slots 42 of the discharge tube holder 20b.

Therefore, as shown in the schematic assembly plan view including the partial section in FIG. 4, when the discharge tube holder 20b moves in the direction of optical axis K by the motion of the drive unit 22e, this moving force is transmitted to the reflection plate holders 21a through contact points D between the discharge tube holder 20b and the reflection plate holders 21a through the slots 42 and the protrusions 43, and the reflection plate holders 21a are interlocked and oscillate in the horizontal direction as indicated by an arrow F on the fulcrum at a fitting point E of the protrusion 40 and the hole 41.

In FIG. 2, the emission angle control means 22 is composed of an input means 22a, a position detecting means 22b, a control unit 22c, a driver 22d, and a drive unit 22e.

As for the emission angle control means 22 composed of the above elements, its operation is described below.

The input means 22a receives an angle-of-view signal Si issued from a photographic apparatus such as a camera, depending on the angle of view of the subject to be taken by the photographic apparatus, or, instead of the angle-of-view signal Si from the photographic apparatus, an angle-of-view signal Si issued from an angle-of-view select switch or the like by manually selecting an angle of view, and issues a set value corresponding to the received value of the angle-of-view signal Si.

On the other hand, the position detecting means 22b senses the configuration of the flash discharge tube 20a and the reflector by detecting the position of the discharge tube holder 20b, and issues a signal corresponding to the configuration sensed.

The control unit 22c calculates the moving amounts of the flash discharge tube 20a and the side reflection plate Ha on the basis of the set value issued from the input means 22a and the signal issued from the position detecting means 22b.

The driver 22d issues a drive signal for driving the discharge tube holder 20b and the reflection plate holder 21a on the basis of the moving amounts of the flash discharge tube 20a and the side reflection plate Ha calculated by the control unit 22c.

The drive unit 22e drives the discharge tube holder 20b on the basis of the drive signal issued from the driver 22d, thereby to drive the discharge tube holder 20b and the reflection plate holder 21a coupled to the discharge tube holder 20b.

For example, when narrowing the emission angle in the horizontal direction in correspondence to the angle-of-view signal Si issued from a camera or the like, the emission angle control means 22 drives the discharge tube holder 20b, thereby to shorten the distance between the flash discharge tube 20a and the reflector on the optical axis K, and to control the angular aperture to be formed by the both side reflection plates Ha to be widened.

According to the above operation, the shortage of the variable range of the emission angle in the horizontal direction, which is caused to occur when only the distance between the flash discharge tube 20a and the reflector on the optical axis K is changed, can be compensated by varying the angular aperture to be formed by the side reflection plates Ha disposed oppositely to both side surfaces of the reflector.

Accordingly, the variable range of the emission angle in the horizontal direction can be expanded, and the size of the apparatus can be made smaller than in the prior art, and the efficiency of utilization of the flash from the flash discharge tube 20a can be enhanced.

In the embodiment described herein, the apparatus is so designed that the distance between the flash discharge tube 20 and the reflector on the optical axis K can be varied by moving the flash discharge tube 20a along the optical axis K. The same effect can be obtained if at least one of the flash discharge tube 20a and the reflector can be moved.

In the foregoing embodiments, as shown in FIG. 4, the reflection plate holder 21a is coupled with the discharge tube holder 20b at the connecting point D, and the emission angle control means 22 is designed to drive the discharge tube holder 20b and the reflection plate holder 21a coupled thereto only by driving the discharge tube holder 20b. It is otherwise possible to so constitute the apparatus as to move the reflection plate holder 21a and the discharge tube holder 20b individually, and to drive the reflection plate holder 21a and the discharge tube holder 20b individually by the drive unit 22e. In such constitution, the emission angle in the vertical and horizontal directions can be precisely adjusted individually, corresponding to every ratio of spread of the subject in both vertical and horizontal directions.

What is claimed is:

1. An emission angle variable flash apparatus comprising a light source for emitting flash and a reflector for reflecting the flash from the light source to an emission subject, said apparatus being capable of varying emission angles of a direct light from the light source and a reflected light from the reflector to the emission subject, wherein side reflection means are disposed oppositely to both side surfaces of the reflector so as to reflect the flash from the light source in the horizontal direction, the light source and the reflector are so constituted that a distance therebetween on their common optical axis may be variable, the side reflection means are so constituted that an angular aperture to be formed thereby may be variable, and an emission angle control means is provided to control the changes of the distance between the light source and the reflector and the angular aperture to be formed by the side reflection means.

2. An emission angle variable flash apparatus according to claim 1, wherein the emission angle control means is so designed to contract the distance between the light source and the reflector on the optical axis and to expand the angular aperture to be formed by the side reflection means, when the emission angle in the horizontal direction is to be narrowed.

3. An emission angle variable flash apparatus according to claim 1, wherein at least one of the light source and the reflector is moved so as to vary the distance between the light source and the reflector on their optical axis.

4. An emission angle variable flash apparatus according to claim 1, wherein the emission angle control means is so designed to calculate the amounts of changes of the distance between the light source and the reflector and the angular aperture to be formed by the side reflection means, on the basis of a set value corresponding to the emission angle required in the emission subject and the configuration of the light source and the reflector, said configuration depending on the distance of the light source from the reflector on the optical axis, and to control, according to the amounts of changes, the distance between the light source and the reflector and the angular aperture to be formed by the side reflection means.

* * * * *